July 26, 1938.　　A. L. FREEDLANDER　　2,124,668
BELT
Original Filed March 27, 1935　　2 Sheets-Sheet 1

INVENTOR
ABRAHAM L. FREEDLANDER
BY
ATTORNEYS

July 26, 1938.     A. L. FREEDLANDER     2,124,668
BELT
Original Filed March 27, 1935    2 Sheets-Sheet 2
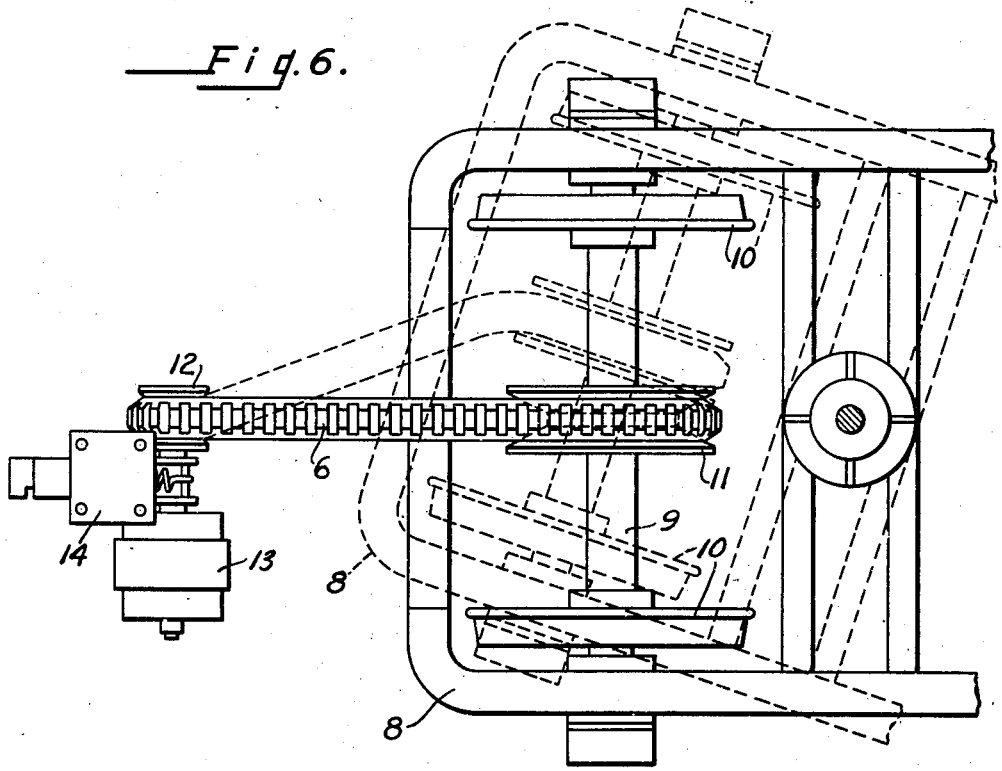
Fig.6.
Fig.7.
INVENTOR
ABRAHAM L. FREEDLANDER
BY
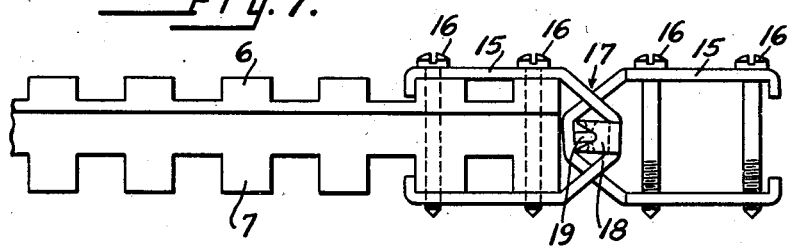
ATTORNEYS Patented July 26, 1938

2,124,668

UNITED STATES PATENT OFFICE 2,124,668

BELT

Abraham L. Freedlander, Dayton, Ohio, assignor to The Dayton Rubber Manufacturing Company, Dayton, Ohio, a corporation of Ohio Original application March 27, 1935, Serial No. 13,305. Divided and this application June 8, 1936, Serial No. 84,175

5 Claims. (Cl. 74—233)

This invention relates to belts.

It is an object of this invention to provide a belt having transversely rigid compression and tension zones and an intermediate flexible zone serving to support and accommodate the movements of the compression and tension zones.

In particular, it is the object of this invention to provide a belt having a square-woven, rubberized fabric tension section and a similar compression section on either side of a bias-woven intermediate section, preferably in combination with teeth formed in the compression section and a wrapper or wrappers enclosing the entire belt.

It is a further object of this invention to provide a belt that is hexagonal in section and composed of a plurality of layers of rubber and fabric material which will not turn over in the grooves of the pulley despite the angularity of the driving with respect to the driven pulley.

It is a further object to provide in such a belt a plurality of sheared teeth on the underside of the belt and optionally on the upper side of the belt, which serves to permit of the belt passing over pulleys of small diameter mounted on close driving centers without the dislodgment of the belt from the pulleys upon the swinging of one pulley with respect to the other.

It is a further object of the invention to provide a neutral axis belt having tension and compression areas on either side of the neutral axis in a belt having six sides and preferably having teeth sheared from the compression and tension areas thereof.

It is a further object to provide a wrapper for a belt of this character.

This application is a division of my application filed March 27, 1935, Serial No. 13,305.

Referring to the drawings:

Figure 6 is a diagrammatic view of the belt of this invention in its operative position, showing the position assumed by the belt when a drive pulley, as on a railway truck, swings with respect to the driven pulley on a generator;

Figure 7 is a side elevation of one end of the belt having attached thereto a connector such as is used with the belt in the relation illustrated in Figure 6.

Figure 1:
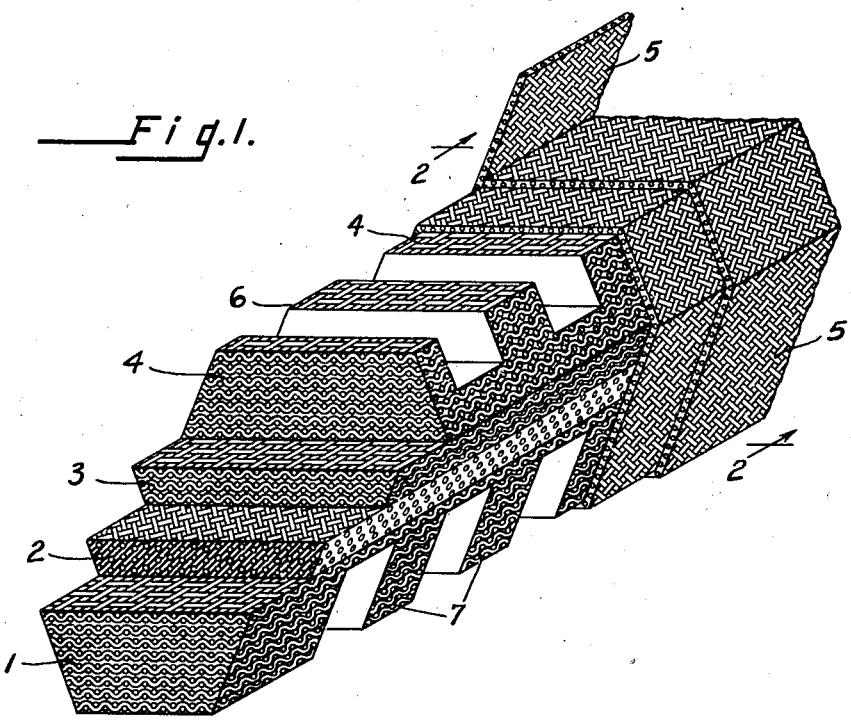
Figure 1 is a view in perspective of the belt, partially cut away to disclose the construction of the belt and of the multiple layer cover.
Figure 2:
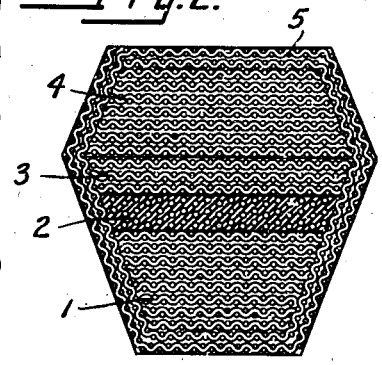
Figure 2 is a section taken on the line 2—2 of Figure 1.
Figure 3:
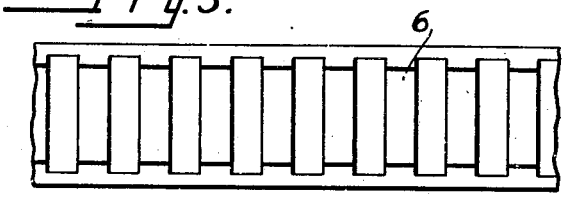
Figure 3 is a top plan view of the belt of Figure 1.
Figure 4:
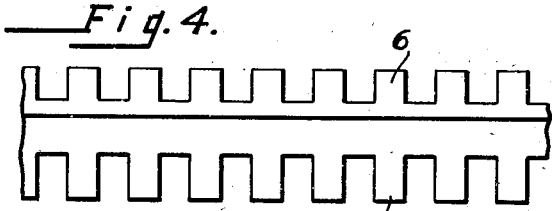
Figure 4 is a side elevation of the belt of Figure 1.
Figure 5:
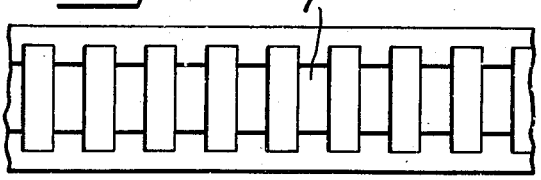
Figure 5 is a bottom plan view of the belt of Figure 1.

Referring to the drawings in detail, the compression section of the belt, as shown in Figures 1 and 2, is designated 1 and is formed of a plurality of layers of square-woven fabric impregnated with rubber. Superimposed upon this compression section is an intermediate section designated 2 comprised of a plurality of layers of bias-woven fabric. This section is adapted to operate as a cushioning section to relieve the belt from the relative movement of the tension and compression sections. A third section designated 3 is superimposed upon the cushioning section 2 and comprises a plurality of square-woven fabric layers imbedded in rubber. This section includes therewithin the neutral axis of the belt and may be designated the neutral axis section. Superimposed upon the neutral axis section 3 is the tension section 4 which is comprised of square-woven fabric layers imbedded in rubber, as is the section 3. The compression section 1 is preferably cut away to form teeth 7 therein and the tension section 4 is cut away to form teeth 6. The sections 1, 2, 3 and 4 have a wrapper 5 disposed therearound, which wrapper is of double thickness, as shown particularly in Figures 1 and 2. This wrapper is preferably secured around the sections 1, 2, 3 and 4 before the teeth 6 and 7 are formed on the respective sections, and the form of the finished belt, after the teeth have been sheared or cut therefrom, is shown particularly in Figures 3, 4 and 5.

Referring particularly to Figure 6, which shows a typical mounting of such a belt as used for driving generators from axles of railway car trucks, 8 designates the frame of the truck having an axle 9 and wheels 10. Mounted on the axle 9 is a pulley 11 which is adapted to drive the pulley 12 of a generator 13, which generator 13 is attached by means of attaching plate 14 to the car body.

The term "V-pulley" turning on a swivel axis is intended to cover the movement of the pulley and its mounting, either by a swivel movement or by a movement such as would occur when the pulley is mounted on a truck pivoted to a car body, as shown in Figure 6. In the United States and Canada, railway track curves, particularly in yards or stations, may cause the angle between the truck and the car body to be out of alignment as much as twenty-three degrees. In driving generators, blowers or other equipment on railway cars, one pulley is mounted on the truck so as to be driven by the wheels of the truck and the other pulley is mounted on the stationary part of the railway car. The present belt will not roll out of the V-curves of the pulley, even when the truck assumes a position of angularity as high as twenty-five degrees with respect to the car body. A V-type belt of a cross section, such as is shown herein, allows the belt to have only the minimum surface in contact with the sides of the pulley groove. While this would normally be considered a disadvantage, it is in this case an advantage, and in the present instance it is disadvantageous to have any more frictional contact than is necessary to effect the driving and to prevent slippage, because, when the railway vehicle is traveling around a curve, either one side of the belt or the other, according to whether a lefthand or a righthand curve is being negotiated, presses very heavily against the side of the pulley groove, and the belt has to travel up and down along the face of the pulley in order to compensate for the shortened distance. If the side driving faces are of maximum height, the belt cannot slide freely and would tend to hang and turn over in the pulley groove. The present belt is so shaped as to be thick enough to transmit the load, but at the same time not increase the side driving surface under the above described conditions of operation. The added thickness of the belt permits the belt to have sufficient screw strength to permit the use of a connector for connecting the ends of the belt, when desired.

In the present invention, the superimposed layers permit lateral flexibility of the belt without dislodging it from the V-grooves of pulleys. This lateral flexibility is achieved without sacrifice of strength by the arrangement of the several sections of the belt with the woven fabric at angles to one another. The covers or wrappers provide uniform, smooth, side bearing surfaces despite the lateral placing of the belt or the bending thereof. By arranging a large number of layers of fabric imbedded in rubber at angles to one another in a series of superimposed planes, it is possible to provide uniform deflection without bulging, either by lateral movement of the belt or by bending movement thereof. This is particularly true when the cross section of the belt is hexagonal, as the resistance to lateral bending of the belt is to be found primarily in the broadest portion of the belt and in the uppermost portion thereof. In the construction of the belt of this invention, by the use of square-woven fabric for the tension and compression sections, relatively incompressible bodies, so far as lateral compression is concerned, are provided; while the greater length of the belt, as compared with the transverse dimension thereof, will provide sufficient compressibility and extensibility of the sections to constitute tension and compression sections. The neutral axis area may be considered as within the lower layers of the tension section because the sections 3 and 4 may be considered a single tension section because of the similar material of which they are composed.

This arrangement is made possible by the use of intermediate, more highly flexible section 2 joining the other sections and above designated the cushioning section. This section 2 is composed of square-woven fabric laid on the bias. It preferably contains a larger amount of rubber than the other sections, as indicated in Figures 1 and 2. The combination of the increased amount of rubber over that found in the tension and compression sections and the bias arrangement of the square-woven fabric provides a relatively resilient stretchable and compressible section, but which acts as an accommodating area between the upper and lower or tension and compression sections, when they are passing about extremely short centers or when there is a lateral swinging of one end of the belt with respect to the other, when used in the relation illustrated in Figure 6. This relatively yieldable internal section 2 permits of short center driving or driving on small pulleys, and the use with pulleys which swing with respect to one another. As this intermediate section 2 is immediately adjacent the neutral axis of the belt, where the minimum movement should take place, this intermediate section accommodates the relative movement of the compression section. It also permits of the extension of the cut-away portions forming the teeth to a depth greater than the depth of the compression section so that the compression section may be comprised, when desired, in reality of a series of compression section teeth held together by the intermediate bias fabric zone or area 2.

When the belt is used as shown in Figure 6, it is preferably an end belt, the ends of which are joined, as shown in Figure 7, by a connector. The connector comprises a clamp 15 retained on the belt by screw bolts 16, which pass completely through the belt and all of its component sections. The ends of the connector of the cooperating connector clamps 15 interengage or are interlaced at 17 in the usual manner and have disposed therebetween the bearing block 18 and pintle pin 19. The details of this connector form no part of this invention and illustration is made thereof merely to show the adaptability and method of use of this belt. In the manufacture of this belt, the layers of square-woven rubberized fabric form a section 1, in which the layers are wound concentrically, one upon the other; the section 2 is then formed by winding concentrically upon the section 1 the layers of rubberized or rubber-imbedded square-woven fabric arranged on the bias; the section 3 is then formed by winding concentrically upon the section 2 a plurality of layers of square-woven rubberized fabric similar to that used in the formation of section 1. As pointed out above, the section 4 may be considered an integral part of the section 3 and it may be formed by continuing the winding of the rubberized or rubber-imbedded square-woven fabric of the section 3.

Although it is to be understood that a cover is not necessary, one may be provided, as is shown, and wrapped upon the component material of the belt after it has been cut in trapezoidal or hexagonal section. If it is desired to form teeth on either the upper or the underside of the belt, or both, the material is sheared away to form the teeth, either before or after the cover is applied.

It will be understood that I desire to comprehend within my invention such modifications as may be necessary to adapt it to varying conditions and uses.

Having thus fully described my invention, what I claim as new and desire to secure by Letters Patent is:

1. In a belt hexagonal in cross section, a compression section comprising a plurality of rubberized square-woven layers of fabric, a plurality of square-woven, bias arranged rubberized layers of fabric superposed on said compression section, a plurality of of square-woven rubberized layers of fabric superposed on said bias arranged rubberized layers of fabric, a cover of rubberized fabric enclosing said belt, the upper reversely tapered part of said belt beneath said cover consisting of straight laid fabric layers exclusively.

2. In a belt hexagonal in cross section, a plurality of rubberized square-woven layers of fabric, a plurality of square-woven, bias arranged rubberized layers of fabric superposed on said first-named layers of fabric, a plurality of square-woven rubberized layers of fabric superposed on said bias arranged rubberized layers of fabric and having the neutral axis of the belt disposed therein, a cover of rubberized fabric enclosing said belt, teeth formed on one side of said belt, the upper reversely tapered part of said belt beneath said cover consisting of straight laid fabric layers exclusively.

3. In a belt hexagonal in cross section, a plurality of rubberized square-woven layers of fabric forming a compression section, a plurality of square-woven, bias arranged rubberized layers of fabric superposed on said compression section and forming an intermediate cushioning section, a plurality of square-woven rubberized layers of fabric superposed on said cushioning section and forming a neutral axis section and a tension section, a cover of rubberized fabric enclosing said belt, teeth formed on the upper and lower sides of said belt, the upper reversely tapered part of said belt beneath said cover consisting of straight laid fabric layers exclusively.

4. A belt of hexagonal cross section having an inwardly disposed toothed compression section, an outwardly disposed toothed tension section which includes the neutral axis of the belt, said compression and tension sections comprising layers of rubberized square woven fabric with the threads arranged longitudinally and transversely of the belt, and a resilient cushioning section disposed between and secured to said compression and tension sections, the upper reversely tapered portion of said belt being formed exclusively of straight laid fabric layers.

5. A belt of polygonal cross section having an inwardly disposed toothed compression section formed of a plurality of layers of square-woven fabric impregnated with rubber, an outwardly disposed toothed tension section including the neutral axis of the belt, and comprising a plurality of layers of square-woven fabric impregnated with rubber, and an intermediate, cushioning section comprising a plurality of layers of square woven fabric arranged on the bias, impregnated with rubber, and adapted to permit relative movement between said compression section and said tension section without injury to the belt, the upper portion of said belt being reversely tapered and formed exclusively of straight laid fabric layers.

ABRAHAM L. FREEDLANDER.